United States Patent [19]
Spencer

[11] 3,829,949
[45] Aug. 20, 1974

[54] PIN FORMING AND INSERTING MACHINE

[76] Inventor: Davis Spencer, c/o Eyelet Tool Co.; Roger St., Weston, Mass. 02142

[22] Filed: Feb. 20, 1973

[21] Appl. No.: 333,773

[52] U.S. Cl............ 29/203 B, 29/203 D, 29/630 D, 72/302, 72/378
[51] Int. Cl............................................ H01r 19/04
[58] Field of Search.......... 29/203 B, 628, 629, 630, 29/630 D; 72/378, 302

[56] References Cited
UNITED STATES PATENTS

| 396,014 | 1/1889 | Thomson | 219/68 |
| 953,041 | 3/1910 | Lachman | 219/50 |
| 2,131,254 | 9/1938 | Miller | 313/261 |
| 2,195,775 | 4/1940 | Gaspar | 219/149 |
| 2,510,788 | 6/1950 | Willet | 225/101 |
| 3,257,708 | 6/1966 | Stricker | 29/203 B |
| 3,302,274 | 2/1967 | Stoltz | 29/203 B |
| 3,307,244 | 3/1967 | DeShong | 29/203 B |
| 3,494,029 | 2/1970 | Theilgard | 29/203 B |
| 3,664,015 | 5/1972 | Bakermans | 29/203 B |

Primary Examiner—Charles W. Lanham
Assistant Examiner—James R. Duzan
Attorney, Agent, or Firm—Charles R. Fay

[57] ABSTRACT

Terminal pins are formed one after another from a wire source (coil) by step-by-step hitch feeding, clamping, and pulling the wire apart to sever pins having tapered ends. A pin so formed is then positioned over a supporting die, the workpiece is placed between the pin and the die, and a plunger ejects the pin and forces it into the workpiece.

12 Claims, 4 Drawing Figures

PATENTED AUG 20 1974 3,829,949

PIN FORMING AND INSERTING MACHINE

BACKGROUND OF THE INVENTION

In the assembly of printed circuit boards, particularly inexpensive ones such as are found in high volume consumer electronics (radio, TV, etc.) generally a single sided printed circuit board made of XXP phenolic is used. This material is generally stamped in high speed presses and the holes for mounting axial lead components and other p.c. board hardware are punched out in the same operation, as a separate drilling process is too expensive. A punched hole cannot be plated as it is too rough walled, so that the occasional interconnections from one side of the boards to the other require the use of a pin of some kind. This pin frequently is furnished of square material so that a jumper wire can be hand wire wrapped to it on the opposite side of the board when needed. This pin is generally made of steel as being the least expensive materials with solder plating for solderability on the plated side of the board.

A requirement also exists for a row of these square pins on equally spaced centers to act as male members of a plug-on input-output connector, the female members to accept these pins being molded into a plastic housing.

Until the development of this machine, these terminal pins were manufactured as a separate loose part. In manufacture they were cut off and the ends coined. Then, prior to solder plating, the parts were tumbled heavily to get rid of the burr caused by the coining operation.

Other types of square pins are preformed as above and carried in a strip into a machine which inserts these parts directly out of the strip and into the p.c. board hole. The disadvantages of this type of part are primarily one of cost in that there is not only the initial cost of the preformed, tumbled and preplated pin, but also its re-insertion into the strip and the cost of the carrier strip itself.

Square terminals have been fed off a coil of wire in the past, but the only way this has been done is by cutting the wire apart with one stroke without any attempt to coin or shape the ends to a point. The disadvantage of this type of part in the p.c. board is that it has no smooth end to permit the easy entry of the wire wrap gun, the raw unplated end of the part tears through the p.c. board during the insertion process, and the part is unsuitable as a male member of an input-output connector system.

SUMMARY OF THE INVENTION

The invention herein combines the cost-saving advantage of using wire in bulk or reel form and the high performance of preformed points. Thus, for the first time, a low-cost, square wire termination can be produced from coil stock which has the correct shape of the point necessary to provide the following features:

1. Easy insertion into p.c. board, minimizing any misalignment problems without damaging the walls of the hole;
2. Easy entry of wire wrap gun;
3. Male connector with the correct ramp configuration to minimize scuffing and dragging on a spring bellows type female connector.

Square wire (solder plated steel) is pulled off a standard reel with adjustable brakes. The wire passes over a tension takeup wheel and through adjustable straightening rolls. A hitch feed clamps the wire, advances it step by step the correct stroke distance, through double clamping jaws. Both jaws close on the wire, then separate from each other. The wire is thereby pulled apart, leaving a tapered nose on each end, with minimal broken area. The jaws unclamp and the formed wire terminal (pin) is pushed into an insertion pocket. The pocket slides forward, under an insertion plunger, and is driven straight down. A lower support die rises up to meet the insertion plunger and supports the p.c. board for the pin insertion operation.

Throughout the insertion cycle, the square wire terminals are prevented from rotating, bending, or insertion at an angle. The pocket is square, and a sleeve around the plunger descends and locks into the pocket before the plunger actually inserts. A hole in the support die likewise receives the terminal (pin) and holds it in correct alignment. Thus the terminal (pin) is guided top and bottom throughout the insertion cycle.

Full interlocks are provided to insure correct sequencing cycle. Both full automatic and manual insertion modes are available; also a check out sequencing mode.

This machine is the first of its kind in the electronic industry to simultaneously form and insert square terminal pins which are suitable for electrical connections with wire wrap or with bellows type connector. The pin is low cost because it is fed from a spool of standard size wire and the resulting part is fully reliable and acceptable throughout the electronic assembly and electronic packaging trade. Further, this is the first machine to manufacture any type of electrical connection by drawing, which deforms the walls of the pin and causes them to collapse inward leaving a gentle ramp or nose, with the plating still intact on this area of the pin. Prior to this time all such pins have been preformed or chopped off with resulting disadvantages in either cost or performance, or both.

PREFERRED EMBODIMENT OF THE INVENTION

Figure 1:
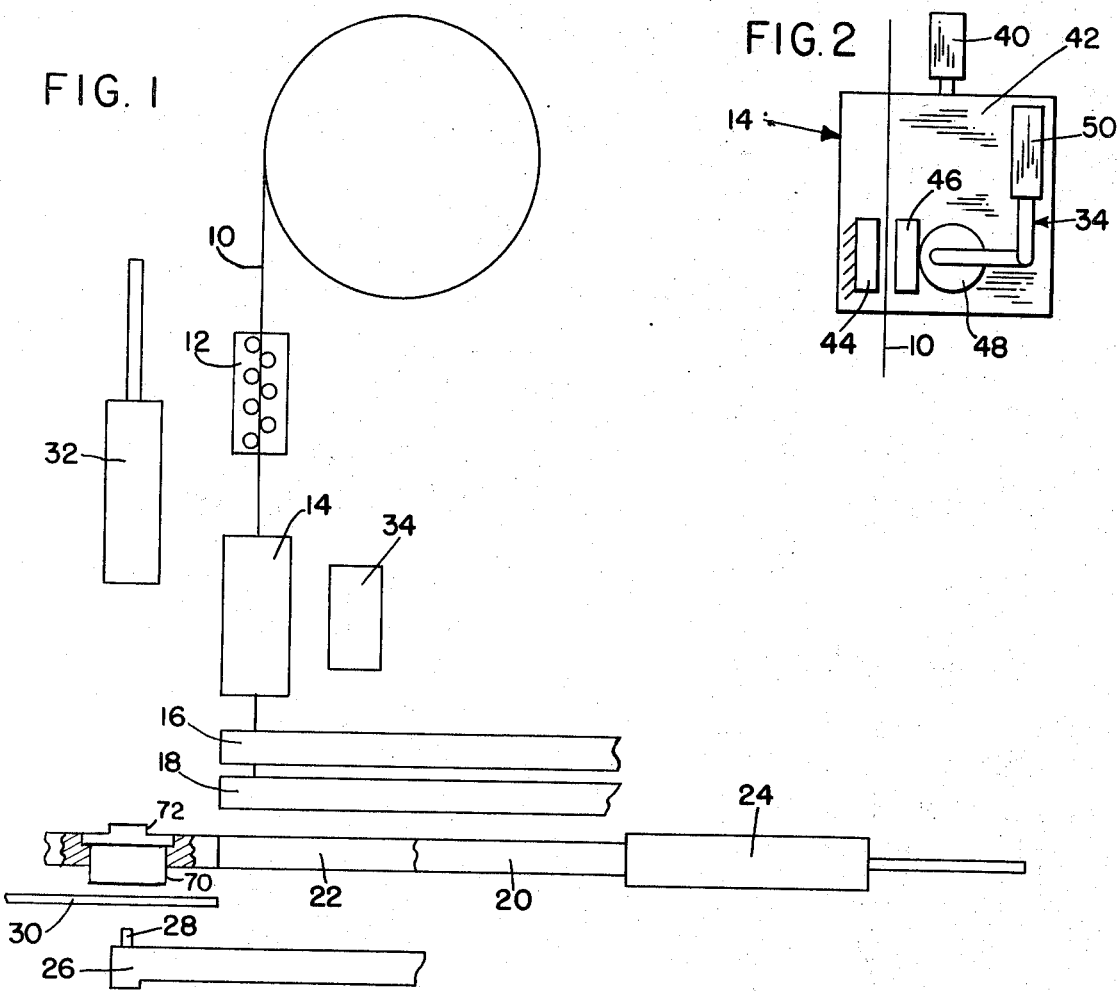
FIG. 1 is a diagrammatic view illustrating the general operation of the machine.

Referring to FIG. 1, which diagrammatically illustrates the entire invention, the wire and its line of advance is shown at 10. The wire passes through a straightening device 12, through the hitch feed 14, which as its name indicates advances the wire step by step to a pair of like wire breaking jaws 16 and 18.

These jaws receive and clamp the wire, and then the lower jaw 18 descends elongating and breaking the wire and positioning the cut off pointed pin into the pocket which is located in a frame 20 and is indicated at 22.

The pocket 22 is then moved by the pocket slide 24 to the left, centering the cut off pin over the bottom die 26 which has an anvil 28.

The bottom die 26 is now raised to a position where it receives the printed circuit board 30 properly positioned by the operator or by automatic means; whereupon the main ram 32 is actuated to bring a plunger downwardly to force the cut off pin which is held in the pocket 22 over the anvil 28, through the board 30, the latter being backed up by the bottom die and anvil 28, ram 32 and anvil 28 being aligned.

All of these operations are automatically timed in sequence and the actions can all be provided with reciprocatory devices such as solenoids or air or hydraulic cylinders. It will be seen that the objects of the invention are accomplished in a simple and efficient manner, the pin having the two tapering ends as above described extending at both sides of the board 30 which is then repositioned to receive the next pin.

The main ram 32 merely provides a simple up and down actuation. The hitch feed 14 has wire gripping jaws actuated by hitch feed clamp 34 and the two jaws 16 and 18 are similarly operated by an extraneous power operated device actuating jaw gripping means in each jaw 16 and 18. Only the lower jaw 18 is moved vertically in order to form the break and to position the pin with respect to the pocket, and this motion is also accomplished by a solenoid or a cylinder. Hitch feed 14 in its downward advancing stroke actually clears the previously formed terminal (pin) and displaces it downward into the pocket 22.

Figure 2:
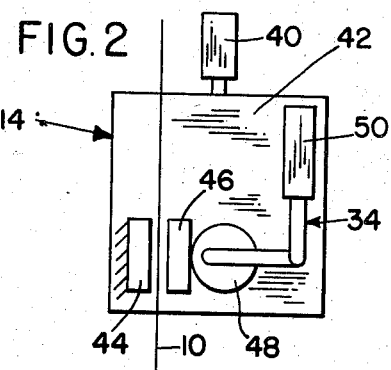
FIG. 2 is a diagrammatic representation of the hitch feed.

One form of hitch feed that can be used, see FIG. 2, resides in the provision of a solenoid or air cylinder 40 which reciprocates a support 42 on which is mounted a fixed jaw 44 and a moveable jaw 46. The movable jaw 46 clamps the wire 10 to fixed jaw 44 by means of an eccentric or cam 48 under the influence of a solenoid or air cylinder 50. The entire device shown in FIG. 2 is referred to generally by the reference numeral 14 in FIG. 1 and the hitch feed clamp 34 is also so indicated in FIG. 1.

Figure 3:
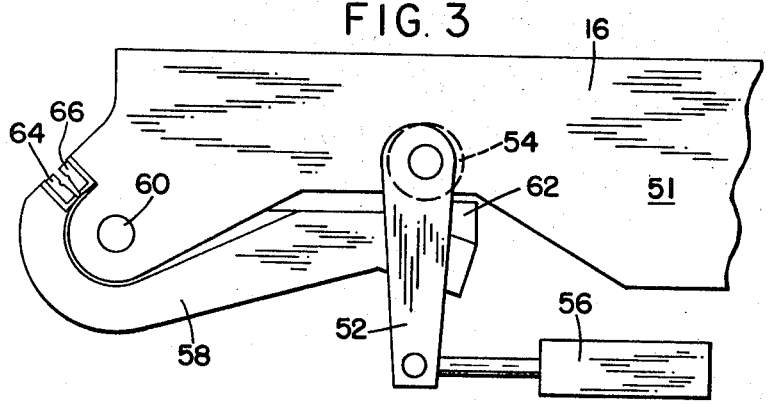
FIG. 3 is a plan view on an enlarged scale of a wire drawing jaw.

One form of wire breaking clamp is shown in FIG. 3. A main body support or jaw body 51 has a cam lever 52 pivoted thereto with an eccentric roller 54 thereon. The lever is operated by a solenoid or air cylinder 56. The movable jaw is indicated at 58 and this is pivoted to the jaw body at 60, having a striker plate 62 which under the influence of the eccentric roller 54 causes the wire jaw 64 to clamp the wire against the fixed wire jaw 66. Both jaws 16 and 18 are the same with the exception that as above described jaw 18 has a vertical motion, as in FIG. 1, to break the wire when jaw 18 is moved downwardly away from jaw 16. The two jaws are in contact with each other at the moment they clamp the wire and jaw 18 moves downwardly sufficiently to break the wire and insert the pin into pocket 22.

Figure 4:
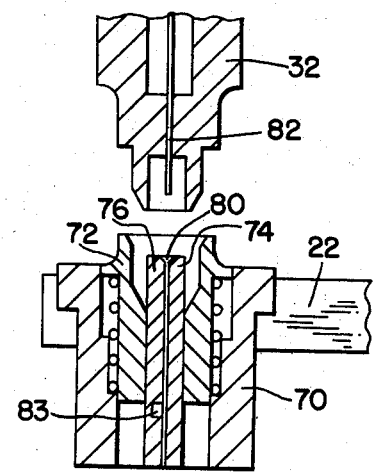
FIG. 4 is a sectional view showing the pocket and plunger.

Pocket 22 is illustrated in FIG. 4. A holder or the like 70 id removably held in the pocket 22 which slides right and left as above described. In the holder 70 there is a spring biased thimble or the like 72 adapted to hold a pair of separate pin holding plates 74 and 76 forming between them a guideway for the pulled apart pin held therein. The plates 74, 76 may be provided with a cone shaped entrance as at 80 to guide the plunger 82 in the main ram 32 which is also actuated by a solenoid or an air cylinder or the like. The respective parts are spring biased as is clearly shown in FIG. 4. If desired a magnet as shown at 83 in one of the plates 74 or 76, or both, may be utilized to hold the pin in position until the plunger 82 ejects the pin into the printed circuit board.

The motion of the pocket to advance the pin to the work piece site may of course be reciprocatory as shown or any other well known motion, i.e., rotary, etc.

Also, the pneumatic means for inserting the pin includes means to cause the plunger to withdraw in case of unwanted excess pressure of the pin on the work piece, and a sensing device for the pin depth to stop the machine prevents incorrect setting and may be built into the apparatus. These devices are not novel per se and are well known in other relations, and have not been shown in detail as those skilled in the art will understand these devices which are available on the market.

I claim:

1. Apparatus for continuously forming and inserting terminals in a work piece comprising a source of square wire, means to advance the wire in step by step relation, wire clamping jaws, means on said wire clamping jaws to clamp the wire, means to move one jaw away from the other while the wire is clamped, stretching and breaking the wire, forming square terminal pins having tapering points on the ends thereof, and being adapted to later wire-wrapping, a pocket, means on the pocket to receive the severed pointed pins, means to move said pocket from the line of advance of the wire to an insertion station, a bottom die at the insertion station, means to move the bottom die in position to back up a work piece thereon, a plunger, said plunger being self-centering into said pocket, and means to move the plunger to eject the terminal pin from the pocket into the work piece simultaneously with the motion of the jaws to form the next succeeding pin.

2. The apparatus of claim 1 including an anvil on the bottom die, a recess therein to receive the portion of the terminal passed through the work piece.

3. The apparatus of claim 2 wherein the bottom die and plunger are aligned and the bottom die is movable toward and away from the plunger.

4. The apparatus of claim 1 including means in the pocket to hold the terminal temporarily.

5. The apparatus of claim 4 wherein said last named means comprises a magnet.

6. The apparatus of claim 1 wherein the terminal is a pin and the pocket comprises a removable holder and a pair of cooperating grooved plates therein, the grooves being aligned forming a passageway for the pin.

7. The apparatus of claim 6 wherein the plates are removable.

8. The apparatus of claim 7 including a magnet in at least one of the plates to temporarily hold the pin in position in the holder.

9. The apparatus of claim 2 wherein the wire clamping means on the wire clamping jaws is in line with the wire being advanced thereto in step by step relation.

10. The apparatus of claim 9 wherein the means on the pocket to receive the wire is aligned with the wire clamping means on the wire clamping jaws in one position of the pocket and aligned with the plunger and anvil in another position thereof.

11. The apparatus of claim 1 wherein the plunger moving means includes means to withdraw the plunger when a predetermined force on the work piece is obtained.

12. The apparatus of claim 1 including means to sense the terminal depth under influence of the plunger and to stop the apparatus action upon incorrect terminal depth.

* * * * *